3,578,436
PROCESS FOR PRODUCING ALUMINUM
Warren E. Becker, Baton Rouge, La., and Paul Kobetz, Southfield, Mich., assignors to Ethyl Corporation, New York, N.Y.
No Drawing. Filed Aug. 20, 1968, Ser. No. 766,013
Int. Cl. B22f 9/00; C22b 21/00
U.S. Cl. 75—.5                                                                25 Claims

ABSTRACT OF THE DISCLOSURE

Aluminum is produced by thermocatalytic disproportionation of dialkylaluminum hydride into aluminum, trialkylaluminum and hydrogen. The amount of olefin liberated, if any, is very small. Unitary operations using the disproportionation reaction for converting crude aluminum into purified aluminum are described. One such operation involves the following:

Crude Al + 2R₃Al + 3/2 H₂ ⟶ 3R₂AlH + solids

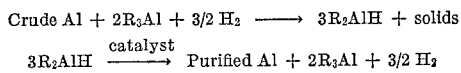

which reduces to

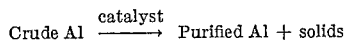

This invention relates to a non-electrolytic process for producing aluminum. More particularly, this invention relates to a process for producing aluminum via a thermocatalytic disproportionation reaction.

Heretofore, considerable attention has been devoted to thermal decomposition processes for producing aluminum from alkyl aluminum compounds. See, for example, U.S. 2,843,474, granted July 15, 1958; Annalen der Chemie, vol. 629, Nos. 1–3, March 1960, pp. 210–221; Canadian Pat. 645,138, issued July 17, 1962; British Pat. 955,860, published Apr. 22, 1964; U.S. 3,154,407, granted Oct. 27, 1964 and U.S. 3,273,996, granted Sept. 20, 1966 (Canadian 682,947, issued Mar. 24, 1964); U.S. 3,170,787, granted Feb. 23, 1965 (Canadian 683,037, issued Mar. 24, 1964); Japanese application 22,474/64 apparently published Oct. 10, 1964; U.S. 3,306,732, granted Feb. 28, 1967 (Canadian 742,636, issued Sept. 13, 1966); and references cited therein.

Despite the extent of these prior investigations, several fundamental shortcomings remain in the art. In the first place, thermal decomposition of alkyl aluminum compounds is a strongly endothermic reaction. Even under the most favorable conditions reported in the above disclosures the lowest temperature of decomposition is reported as 145–160° C. (U.S. 3,306,732; Table 1).

Secondly, in the prior processes involving thermal decomposition of ethyl or higher alkyl aluminum compounds, almost quantitative amounts of olefin are produced along with the aluminum and hydrogen. Although it has been recommended that the olefin and hydrogen be reused to prepare additional alkyl aluminum compound for use in the decomposition step, the reaction of olefin, hydrogen and aluminum is generally not particularly rapid, especially where ethylene is concerned. Moreover, some of the liberated olefin tends to be hydrogenated both during the course of the thermal decomposition step itself (see, for instance, the examples of U.S. 3,154,407) and in the reaction of crude aluminum with olefin and hydrogen (see, for instance, U.S. 2,843,474).

Thirdly, unless care is exercised in practicing process technology and innovations described in connection with some of these prior thermal decomposition processes, the production of aluminum excessively contaminated with aluminum carbide is a likely prospect.

In our copending application Ser. No. 653,622 filed July 17, 1967, and now abandoned a superior chemical process for producing aluminum is described. In accordance with that process a system formed from an alkylaluminum hydride, a tertiary amine and a suitable dissociation catalyst is subjected to a temperature sufficiently high and for a period of time sufficiently long to cause formation of aluminum and hydrogen but insufficient to cause an appreciable amount of hydrocarbon to be liberated. In that process the alkyl aluminum hydride is converted into aluminum, hydrogen and an aluminum alkyl coproduct through the conjoint use of the dissociation catalyst and the tertiary amine.

It has now been discovered that dialkylaluminum hydride may be thermocatalytically disproportionated into aluminum, hydrogen and trialkylaluminum even though no tertiary amine is present in the system. This invention makes it possible to produce aluminum via a chemical process which may be operated at relatively low temperature and in which quantitative or almost quantitative amounts of olefin are not liberated—in fact, the amount of olefin liberated, if any, is very small. Aluminum of a purity comparable to or above that of primary aluminum is attainable in the process. The cost of the tertiary amine and the expense of handling it in the process are eliminated.

Thus in accordance with this invention we provide a process for producing aluminum which comprises thermocatalytically disproportionating dialkylaluminum hydride into aluminum, hydrogen and trialkylaluminum and recovering the aluminum so formed. In conducting this process the dialkylaluminum hydride is subjected to sufficient thermal energy in the presence of a suitable catalyst to cause the following reaction to occur:

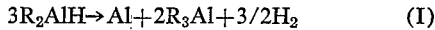

It will be seen that hydrogen and trialkylaluminum are coproduced in the process. All or a portion of either or both of these coproducts can be used to generate additional dialkylaluminum hydride via the equation:

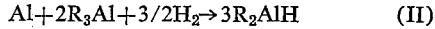

This dialkylaluminum hydride may in turn be subjected to the thermocatalytic reaction—Equation I above—to generate still additional aluminum plus the reusable coproducts.

When conducting the process of this invention, it is not essential to carry reaction (I) to completion since residual R₂AlH can be recycled along with the R₃Al without any detrimental effect upon reaction (II).

In comparison to the hydrogen evolved, the amount of hydrocarbon (e.g., olefin) liberated in the present process is very small. In particular, the amount of free olefin or other free hydrocarbon derived from the alkyl aluminum fed into and produced in the process will be no more than about 15 mol percent, the amount of hydrogen evolved being at least 85 mol percent. In fact, the present process can readily be operated such that the mol ratio of liberated hydrogen to liberated hydrocarbon is at least 9:1. On the other hand, the prior processes exemplified by the disclosures cited above are understood to proceed via the equations:

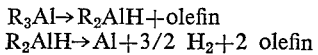

so that essentially quantitative amounts of olefin are liberated.

One way by which the above thermocatalytic disproportionation may be effected involves heating dialkylaluminum hydride in the presence of a disproportionation promoting amount of at least one catalytic compound of a metal of Group IV–B (titanium, zirconium, hafnium), Group V–B (e.g., vanadium), the Lanthanide Series or the Actinide Series to an elevated temperature at which metallic aluminum is formed without liberating an excessive amount of olefin or paraffin (i.e., the mol ratio of liberated hydrocarbon to liberated hydrogen does not exceed 15:85 and is preferably 1:9 or below). Another way of effecting the disproportionation involves the conjoint use of an alkali metal catalyst. The use of the alkali metal catalyst in combination with the catalytic compound of the heavy metal (Group IV–B, etc.) is advantageous in that the rate of the disproportionation reaction is increased over the rate afforded by the heavy metal compound alone. Accordingly, the use of these co-catalyst systems in conducting the process constitutes a preferred embodiment of this invention.

A variety of dialkylaluminum hydrides may be disproportionated into aluminum, hydrogen and trialkylaluminum in this manner. The alkyl groups of such compounds may be straight chain or branched chain and will preferably be the same in a given compound. Each alkyl group may contain from 1 to 18 or more carbon atoms. Thus use may be made of dimethylaluminum hydride, dipropylaluminum hydride, dibutylaluminum hydride, di-isobutyl aluminum hydride, di-sec-butyl aluminum hydride, dihexylaluminum hydride, dioctylaluminum hydride, dicetylaluminum hydride, and the like. Dialkylaluminum hydrides in which each alkyl group is straight chain in character and contains from 2 to 8 carbon atoms are preferred for use in this invention. The use of diethylaluminum hydride is particularly preferred because it has a very high aluminum content (second only to dimethylaluminum hydride and methylethylaluminum hydride, both of which are more difficult and costly to prepare). Moreover, diethylaluminum hydride is an ethylene-based compound (whether made directly from ethylene, aluminum and hydrogen or indirectly from aluminum, hydrogen and triethylaluminum, the latter being most readily prepared according to present-day technology from ethylene). It is of course well recognized that ethylene is widely available at relatively low cost.

With reference to diethylaluminum hydride as a particularly preferred material for use in practicing the present invention, it is worth noting that some of the above-cited processes are indicated as being applicable only to alkyl aluminum compounds in which the alkyl groups are butyl or higher. Moreover, a cross-reading of Examples 1 and 2 of U.S. 3,170,787 indicates that the prior art thermal decomposition processes are more suitable for isobutylaluminum compounds than ethyl aluminum compounds because the latter, when utilized in accordance with the prior teachings, tend to form aluminum contaminated with considerable amounts of aluminum carbide. Self-evidently, this undesirable aluminum carbide impurity results from homolytic cleavage of carbon-to-aluminum bonds, a type of cleavage which apparently does not occur when the aluminum is released via thermocatalytic disproportionation. Pursuant to the present invention, diethylaluminum hydride can be utilized with great advantage in preparing aluminum containing less than 0.1 percent by weight of aluminum carbide.

The heavy metal compounds used as catalysts for the disproportionation are of various types. For example the compounds may be simple inorganic halides such as titanium tetrachloride, titanium tetrabromide, titanium tetraiodide, titanium tetrafluoride, titanium trichloride, titanium tribromide, titanium dichloride, zirconium tetrachloride, zirconium trichloride, hafnium tetrachloride, vanadium tetrachloride, vanadium tribromide, vanadium oxytrichloride, cerium trichloride, samarium trichloride, gadolinium trichloride, thorium tetrachloride, uranium tetrachloride, uranyl chloride, uranyl iodide, and the like. Alkoxy, aryloxy and cycloalkoxy derivatives of titanium, zirconium, hafnium, and vanadium are also suitable. Thus the catalytic compond may be titanium tetraethoxide, titanium tetraisopropoxide, titanium tetrabutoxide, titanium tetradodecoxide, zirconium tetrapentoxide, hafnium tetramethoxide, triethoxy titanium chloride, dibutoxy titanium dichloride, titanium tetraphenoxide, triphenoxy titanium chloride, di-(methylphenoxy)titanium dibromide, phenoxy zirconium trichloride, tetracyclohexoxy titanium, tetrabenzoxy titanium, and the like. Normally each hydrocarbonoxy group will contain up to about 30 carbon atoms. Organometallic compounds may also be used and are exemplified by bis-cyclopentadienyl titanium dichloride, cyclopentadienyl titanium tribromide, bismethylcyclopentadienyl zirconium dichloride, and the like. Each hydrocarbon group of these organometallics will usually contain up to about 14 carbon atoms. Also, suitable salts of carboxylic acids may be employed—e.g., cerous oxalate, uranyl acetate, uranyl propionate, uranyl octanoate, uranyl oleate, and the like. In most cases, each acid radical of such salts will contain up to about 20 carbon atoms. Other classes of compounds in which operable catalytic species reside include chelates, such as bis-(acetylacetonato)titanium monoxide and bis-(acetylacetanato)-titanium dichloride; alkylamino derivatives, such as tetrakis-(dimethylamino)titanium; and complex salts, such as the toluene complex of titanium dichloride/aluminum chloride ($C_7H_8 \cdot TiCl_2 \cdot Al_2Cl_6$). Thus numerous types of compounds of metals of Group IV–B, Group V–B, the Lanthanide Series and the Actinide Series afford operable catalytic species and compounds beyond those exemplified herein may prove entirely suitable. Indeed, compounds of other heavy metals may show catalytic activity and thus be suitable for use in practicing this invention. For example, nickel acetylacetonate has been found to have some catalytic effectiveness in the process. The suitability of any given heavy metal compound as a catalyst for the present disproportionation process can be readily ascertained by running a few simple laboratory experiments.

Of the foregoing catalysts, catalytic compounds of titanium, especially titanium halides and titanium alkoxides, are preferred. The most preferred catalysts are the titanium chlorides and the titanium tetraalkoxides in which each alkoxy group contains 1 to 16 carbon atoms.

In some cases it has been found desirable to complex the catalytic compound with an ether or similar complexing agent. In this way the catalytic effectiveness of the heavy metal compound may be enhanced, perhaps by rendering the compound more soluble in the reaction system. To illustrate, the catalytic effectiveness of titanium trichloride and of titanium dichloride is enhanced by prior complexation with tetrahydrofuran.

These heavy metal catalysts are preferably introduced into the disproportionation zone in relatively small quantities—e.g., from 1 part per 100,000 parts of aluminum produced up to 1 part per 100 parts of aluminum produced, these parts being on a weight basis. Preferably, the quantity of catalyst used will be on the low side—i.e., one will normally use not much more than the smallest quantity of catalyst which will produce the desired rate-enhancing result under the particular conditions and with the particular system being used. Whether the above materials exhibit their catalytic effects while existing in their original chemical state or whether they become chemically transformed before or during the course of their catalytic activity is not known. In any event, it has been verified experimentally that the introduction of such catalytic materials into the suitably heated reaction zone gives rise to the accelerated liberation of aluminum and hydrogen without the formation of excessive quantities of free olefin or other free hydrocarbons. In some cases it is advantageous to introduce the catalyst into the zone in small increments during the course of the disproportionation.

As indicated above, a preferred embodiment of this invention involves disproportionating the dialkylaluminum hydride through the conjoint use of at least one heavy metal catalyst and at least one alkali metal catalyst. The alkali metal catalysts still further accelerate the rate of the disproportionation reaction. For best results the alkali metal content of the disproportionation system will generally be in the range of about 0.01 to about 2 percent by weight (expressed in terms of alkali metal although normally it will be present in the form of a chemical compound or complex) based on the weight of dialkylaluminum hydride initially present in the system. Among the preferred catalysts for addition to the reaction system are metallic sodium, sodium hydride, sodium amide, sodium aluminum tetrahydride, sodium aluminum hexahydride, sodium fluoride, sodium cyanide, sodium aluminum tetraalkyl, sodium aluminum dialkyl dihydride, sodium aluminum trialkyl hydride, sodium carboxylates, and the like, especially where the alkyl groups (if present in the catalyst) each contain up to about 18 carbon atoms. The corresponding sodium aluminum aryls and cycloalkyls are also entirely suitable. Indeed, lithium, potassium, rubidium and cesium are suitable catalysts, whether charged into the system in metallic form or in the form of a chemical compound or complex corresponding to the sodium derivatives already referred to. Mixtures of different alkali metals or compounds thereof may be used. From the cost effectiveness standpoint, catalysts based on sodium are preferred.

The temperature of the system should be high enough to enable the disproportionation reaction to occur but not so high as to result in thermal decomposition of aluminum alkyl and consequent evolution of excessive quantities of olefin or other liberated hydrocarbon. The precise temperature which is best for any given system will thus vary to some extent depending upon such factors as the identity of the dialkylaluminum hydride employed, the amount and character of the heavy metal catalyst employed, and the amount and character of the alkali metal co-catalyst if employed. Generally speaking however the temperature of the system will generally be in the range of from about 60 to 250° C., temperatures in the range of from about 120 to 190° C. being preferred.

In general, the length of time any given aluminum forming system of this invention is subjected to disproportionation-inducing temperature will be inversely proportional to the temperature being used. For example, periods ranging from a few minutes to about one hour are used when the process is operated at temperatures above about 120° C. However at lower temperatures correspondingly longer reaction or residence times may be utilized, e.g., up to several hours or more.

It will be understood and appreciated that the foregoing temperature-time relationships will vary depending upon the make up of the particular reaction system being utilized, and indeed, upon whatever small amount of free olefin or other liberated hydrocarbon is deemed acceptable for the purposes at hand. The suitable and the optimum temperatures and residence or heating times for any given system of this invention can readily be determined in each case by a few simple experiments. In each case the temperature and time used should be sufficient to form aluminum and gaseous hydrogen but insufficient to liberate an excessive amount of free hydrocarbon (e.g., free olefin).

When conducting this process it is preferable that the system being subjected or heated to the appropriate temperature include a trialkylaluminum, especially one which corresponds to the dialkylaluminum hydride being used. This is advantageous because when forming dialkylaluminum hydride the corresponding trialkylaluminum compound is almost always present in the product and thus the resulting mixture of alkyl aluminum compounds can be utilized in this process. In short, it is not necessary to effect a separation betwen these alkyl aluminum compounds. Further, trialkylaluminum compounds which have relatively high thermal decomposition temperatures (e.g., triethylaluminum) serve as a very convenient carrier of thermal energy to the aluminum-forming system. That is to say, separate portions of such trialkylaluminum compounds may be preheated to an appropriate temperature below their thermal decomposition temperature and be directly introduced or fed into the disproportionation zone whereby the suitable aluminum-forming temperature is maintained or produced in the zone at least in part in this manner.

It is generally advantageous, when utilizing a combination of alkylaluminum hydride and trialkylaluminum, that all of the alkyl groups be identical straight chain groups, each containing from 2 to about 8 carbon atoms. Systems wherein the alkylaluminum content is composed of diethylaluminum hydride and triethylaluminum are most especially preferred.

When utilizing the desirable combination of dialkylaluminum hydride and trialkylaluminum, the relative proportions thereof can vary within relatively wide limits. For example, weight ratios of $R_2AlH:R_3Al$ ranging upwards from 1:15 can be used. It is most practical to use mixtures which contain at least about 50 percent by weight of the dialkylaluminum hydride, the balance being the trialkylaluminum compound.

In applying heat energy to bring about thermocatalytic disproportionation, a variety of heating procedures may be used. For example, heat may be periodically or continuously supplied so that the appropriate disproportionation temperature is continuously maintained within the reaction zone (a procedure useful in continuous operation) or the systems may be formed and then their temperature raised—either in one stage or in a plurality of incremental stages—to the appropriate temperature, as in a batch or semi-continuous type operation. If desired, the systems may be formed (except for the heavy metal catalyst) and quickly brought up to the appropriate temperature at which point the thermal disproportionation catalyst is introduced into the system whereby formation of metallic aluminum and evolution of gaseous hydrogen occur. Furthermore, the heat energy may be impressed upon the reaction systems (e.g., by means of electric heating elements, heat transfer from suitable liquids of high thermal capacity and stability, or the like) or at least a portion of the thermal energy may be carried into the disproportionation zone by preheating one or more of the ingredients being fed into the zone, notably the trialkylaluminum feed, as explained above. It is also possible to bring the reaction systems in contact with suitably heated aluminum surfaces (e.g., bars, pellets, or the like) whereby the aluminum which is produced plates out on or otherwise adheres to such surfaces. These and other suitable methods for the application of heat for effecting the above process will now be clearly evident to those skilled in the art.

It is preferable to conduct the disproportionation reaction in a liquid phase as this facilitates the recovery of the aluminum produced. In many cases the dialkylaluminum hydride/trialkylaluminum mixtures are themselves liquid at ordinary reaction temperatures. However whether or not the dialkylaluminum hydride feed is normally liquid, an auxiliary solvent or diluent may be employed. For this purpose inert hydrocarbons which are liquid at the reaction temperature (and thus having boiling points in excess of the reaction temperature) are particularly convenient. Exemplary of the hydrocarbon media which may be employed are the paraffinic, cycloparaffinic, and aromatic hydrocarbons such as petroleum naphthas, paraffin oils, alkyl benzenes, alkyl naphthalenes, petroleum ether, gasoline or kerosene (so long as an appreciable amount of olefinic unsaturation is not present therein), biphenyl and alkylated derivatives thereof, and the like. In addition to or in lieu of such hydrocarbon diluents, use may be made of silicone oils, fluorocarbons or other diluents which do not interfere with the desired reaction or cause contamination of the aluminum produced. In practicing this process the liquid phase may include alkyl alkoxy aluminum compounds such as diethyl ethoxy aluminum and the like. Generally speaking, it is preferable to conduct the process of this invention in the absence of such auxiliary media inasmuch as essentially liquid phase systems can readily be produced by utilizing suitable alkylaluminum component(s), such as diethylaluminum hydride, alone or in admixture with triethylaluminum, both of which are liquids at room temperature.

The various materials to be present in the aluminum-forming reaction system may be fed into the disproportionation reaction zone in many different ways. For example, the dialkylaluminum hydride, heavy metal disproportionation catalyst, alkali metal-containing disproportionation promoter (if used), trialkylaluminum (if used) and auxiliary reaction diluent (if used) may be fed separately or in any appropriate subcombination, either concurrently or in any suitable sequence, or they may be fed in combination with each other.

In conducting this process one may resort to seeding of finely divided aluminum powder into the aluminum producing system, if desired. The seeding of the system with aluminum powder tends to increase the average particle size of the aluminum formed via thermocatalytic disproportionation. In this connection, the seed aluminum powder may be added directly to the reactor or it may be first mixed with alkylaluminum component(s) and the resulting suspension introduced into the reactor. When charging the feed directly to the reactor recourse may be had to preheating the powder (i.e., in a suitable oven) to an appropriate elevated temperature so that the particulate aluminum as fed into the reactor is already at a suitable reaction-promoting temperature.

The aluminum produced in the present process is readily separated from the reaction system by various common techniques. For example, when particulate aluminum is formed in an otherwise essentially liquid phase system, the aluminum product can be isolated by means of filters, centrifuges or like equipment. It is desirable to wash the isolated aluminum product with an appropriate inert liquid which will remove residual quantities of alkylaluminum materials and the like. For this purpose low boiling paraffinic or aromatic hydrocarbons such as pentane, hexane, heptane, benzene and the like are particularly suitable. These low boiling materials are not only inert washing agents but can be readily removed from the purified aluminum powder by common drying techniques. In short suitably volatile inert hydrocarbons will not leave undesirable residues upon the surface of the aluminum product. After the washing operation, the aluminum may be heated to an elevated temperature (e.g., 150° C.) under a suitable vacuum (e.g., 10 to 100 mm. Hg) to remove any traces of aluminum alkyl and/or adsorbed hydrogen.

Particularly preferred embodiments of this invention involve the use of the disproportionation operation as a part of a comprehensive process for the chemical refining of crude aluminum. One such embodiment involves at least the following steps:

(a) Covering crude metallic aluminum into a dialkylaluminum hydride-containing liquid phase and a residual solids phase;

(b) Effecting separation between these phases;

(c) Subjecting the separated liquid phase together with a small amount of the heavy metal thermal disproportionation catalyst to a temperature sufficiently high and for a period of time sufficiently long to cause the formation of aluminum and hydrogen but insufficient to cause the liberation of an excessive amount of hydrocarbon; and (d) Recovering the aluminum formed in (c).

Various types of crude metallic aluminum are suitable for use in step (a). For example, the crude aluminum may be in the form of aluminum alloys, aluminum scrap, aluminum dross, or the like provided the aluminum-bearing material contains at least some metallic aluminum which is not held in the tightly bound form of an intermetallic compound. Aluminum-silicon alloys are especially preferred as materials to be refined in the process.

Aluminum-silicon alloys can be produced by various electrothermic reduction processes (see, for example, British Pat. 1,073,025) and thereby serve as a relatively economical source for purified aluminum metal. Moreover, when using such alloys the residual solids formed in step (a) of the present process will comprise metallic silicon (usually but not necessarily associated with other common impurities such as iron, titanium, and the like). Such residual solids, which can be readily recovered, are of utility, for example, in steel making processes.

The crude aluminum is preferably employed in subdivided or particulate form although effective use may be made of turnings, chips, flakes, ribbons, fragments, and the like.

In practicing the above step (a) there are two general methods for converting the crude metallic aluminum into the dialkylaluminum hydride-containing liquid phase. One such method involves reacting the aluminum content with appropriate quantities of an alpha-olefin (e.g., ethylene, propylene, isobutylene, etc.) and hydrogen in the presence of an alkylaluminum catalyst (e.g., triethylaluminum). In this way it is possible to convert this aluminum content into a product which in most cases comprises the corresponding dialkylaluminum hydride and trialkylaluminum compounds. As is well known, it is desirable to suitably activate the aluminum so as to reduce the induction and reaction times. These reactions are generally carried out at somewhat elevated temperatures and pressures. For further details relative to this type of operation, reference may be had, for example, to U.S. Pats. 2,787,262; 2,886,581; 2,900,402; 3,000,919; 3,016,396; 3,032,574; 3,050,540; 3,050,541; 3,207,773; 3,207,774; 3,381,024 and 3,393,217.

The other, and decidedly preferred, method for converting the crude metallic aluminum into the dialkylaluminum hydride-containing liquid phase involves reacting the crude aluminum with appropriate quantities of trialkylaluminum and hydrogen. This reaction proceeds very smoothly and under proper conditions, quite rapidly, whereby dialkylauminum hydride can be formed in good yield. Moreover the use of this type of process makes it possible to recycle or re-utilize the trialkylaluminum coproduct which is formed in the aluminum-producing step.

Therefore, another particularly preferred embodiment of this invention involves converting the crude aluminum into a dialkylaluminum hydride-containing liquid phase and residual solids by reacting the aluminum with trialkylaluminum and hydrogen under appropriate reaction conditions. Such conditions preferably include use of subdivided crude aluminum alloy, activation of the aluminum by common techniques, and utilization of suitable elevated temperature and pressure conditions. For further details concerning these reaction conditions reference may be had, for example, to U.S. Pats. 2,885,314; 3,050,-540; 3,050,541; 3,207,770; 3,207,772; 3,382,269 and 3,393,217.

Once the above dialkylaluminum hydride-containing liquid phase and the residual solids phase have been formed it is a very simple matter to effect a separation therebetween. Filtration, centrifugation and the like will most commonly be used. Thereupon the separated liquid phase is subjected to the thermocatalytic disproportionation process as described above so that high purity aluminum, hydrogen and trialkylaluminum are formed. Thereupon the aluminum is readily recovered by such techniques as filtration or centrifugation.

The separations involved in the above-described unitary process are facile in that they generally involve separating solids from liquid phases.

An especially advantageous feature of this process is that it is susceptible to re-utilization or recycle of the trialkylaluminum coproduct and the gaseous hydrogen which remain after separation and recovery of the aluminum product. Naturally it is possible to reuse less than all of the trialkylaluminum coproduct and gaseous hydrogen remaining in or released from the reaction system. However a feature of this process is that each of these can be reused in forming additional dialkylaluminum hydride liquid phase for use in the over-all process. Thus in essence a particularly preferred embodiment of this invention involves operation via the following sequence of reactions:

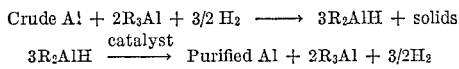

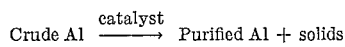

Inasmuch as the trialkylaluminum coproduct and the hydrogen can be reused, the foregoing equations reduce to the following:

$$\text{Crude Al} \xrightarrow{\text{catalyst}} \text{Purified Al + solids}$$

It will be seen therefore that this invention now makes possible an efficient process for producing aluminum, a process which comprises the following steps:

(1) Forming in a reaction zone a dialkylaluminum hydride-containing liquid reaction product from crude metallic aluminum, trialkylaluminum, and hydrogen, said aluminum initially being associated with one or more solid impurities;

(2) Effecting separation between the resulting solids and the liquid reaction mixture;

(3) Disproportionating dialkylaluminum hydride in the mixture from (2) into aluminum, hydrogen, and trialkylaluminum;

(4) Recovering aluminum formed in (3); and (5) Supplying trialkylaluminum and hydrogen formed in (3) to the reaction zone of (1) for producing more of the liquid reaction product by interaction with additional crude metallic aluminum.

Because this process involves use of, in effect, a circulating inventory of trialkylaluminum and re-utilization of the hydrogen in step (1) above, this particularly preferred embodiment is well suited for operation on a continuous basis. Except for make-up quantities of trialkylaluminum and hydrogen, this particular unitary operation in essence uses alkylaluminum compounds as carriers for conversion of crude aluminum into purified aluminum.

The aluminum product produced in accordance with this invention may, if desired, be converted into various others forms. For example aluminum powder produced in the process may be pigged, rolled, or sintered thereby providing other commercially useful forms of aluminum.

The practice and advantages of this invention will become still further apparent from a consideration of the following illustrative examples.

EXAMPLE I

A solution made from 25 milliliters of commercially available diethylaluminum hydride-triethylaluminum mixture (approximately equimolar), 2 grams of sodium aluminum tetraethyl, 10 milliliters of toluene and about 0.01 milliliter of titanium tetraisopropoxide was heated to reflux temperature (110–120° C.) for 35 minutes. The principal products were gaseous hydrogen and aluminum metal, the latter precipitating from the solution.

EXAMPLE II

The procedure of Example I was repeated except that the solution initially contained 5 grams of sodium aluminum tetraethyl. On refluxing the solution for 35 minutes 850 milliliters of gas (predominantly hydrogen) was evolved and finely divided metallic aluminum was formed.

EXAMPLE III

A solution made from 20 milliliters of commercially available diethylaluminum hydride-triethylaluminum mixture (approximately equimolar), 1.5 grams of sodium aluminum tetraethyl, 5 milliliters of toluene and 0.01 milliliter of titanium tetrachloride was refluxed for 28 minutes. During this time gas (principally hydrogen) was evolved and a total of 0.63 gram of aluminum powder was produced.

EXAMPLE IV

Titanium tetrachloride (0.005 milliliter) was added to an approximately equimolar commercial mixture of diethylaluminum hydride and triethylaluminum (20 milliliters) and the system heated to 150° C. for 20 minutes. During this time finely divided aluminum formed in the system and 500 milliliters of gaseous coproduct (mostly hydrogen) was evolved.

EXAMPLE V

Titanium tetrachloride (7 milligrams Ti) was added to 23 milliliters of a mixture of diethylaluminum hydride and triethylaluminum (approximately 60:40 mol percent respectively) and the resultant system was maintained at 120° C. while determining the rate of the thermocatalytic disproportionation by measuring at periodic intervals the amount of hydrogenous gas evolved. The identical procedure was then applied to another portion of the same aluminum alkyl-TiCl$_4$ system but to which had been added 0.5 weight percent of sodium as sodium aluminum diethyl dihydride. In both runs finely divided aluminum was formed. Reaction rate data are given in Table I.

TABLE I.—RATE OF THERMOCATALYTIC DISPROPORTIONATION AT 120° C.

| Time, minutes: | Volume of gas evolved, milliliters | |
|---|---|---|
| | Without sodium co-catalyst | With sodium co-catalyst |
| 10 | 170 | 700 |
| 20 | 300 | 960 |
| 30 | 410 | 1,040 |

EXAMPLE VI

The same procedure as described in Example V was used except that the comparative experiments were run at 170° C. Rate data so obtained are given in Table II.

TABLE II.—RATE OF THERMOCATALYTIC DISPROPORTIONATION AT 170° C.

| Time, minutes: | Volume of gas evolved, milliliters | |
|---|---|---|
| | Without sodium co-catalyst | With sodium co-catalyst |
| 5 | 600 | 930 |
| 10 | 850 | 1,130 |
| 20 | 1,050 | 1,275 |

EXAMPLE VII

In experiments utilizing procedures similar to those described in Examples V and VI, the following alkali metal species were found effective as co-catalyst additives when utilized in conjunction with titanium tetrachloride:

Sodium fluoride
Potassium chloride
Sodium ethoxide
Potassium tertiary butoxide
Lithium aluminum tetrahydride
Sodium stearate

EXAMPLE VIII

A number of thermocatalytic disproportionation experiments were carried out under identical reaction conditions using different catalytic compounds of titanium or zirconium. In each run a quantity of the heavy metal catalyst compound equivalent to 50 milligrams of Ti or Zr was added to 23 milliliters of the mixture of diethylaluminum hydride and triethylaluminum referred to in Example V. Each sample also contained 0.5 percent by weight of sodium primarily in the form of sodium aluminum diethyl dihydride). Each of the resulting systems was maintained at a temperature of 170° C. while measuring the amount of hydrogenous gas evolved. In all cases finely divided aluminum was formed concomitantly. Illustrative data are given in Table III.

TABLE III.—EFFECTIVENESS OF VARIOUS GROUP IV–B CATALYSTS AT 170° C

| Heavy metal catalyst: | Vol. of gas evolved in 5 min., ml. |
|---|---|
| Titanium tetrachloride | 1050 |
| Titanium trichloride | 700 |
| Cyclopentadienyl titanium trichloride | 140 |
| Titanium tetrabutoxide | 580 |
| Tris - (p - chlorophenoxy)titanium tertiary butoxide | 500 |
| Titanium tetrabenzoxide | 500 |
| Bis-(cyclopentadienyl)zirconium dichloride | 80 |
| Titanium tetrafluoride | 90 |
| Titanium trifluoride | 210 |
| Titanium tetraiodide | 180 |
| Bis-(cyclopentadienyl)titanium dichloride | 130 |
| Cyclopentadienyl titanium dichloride methoxide | 450 |
| Tetrakis-(dimethylamino)titanium | 450 |

Correlation of gas composition data from these and other similar runs indicated that hydrogen purity is proportional to the rate of disproportionation. For example, hydrogenous gas evolved at a rate of 42 milliliters per minute contained 92.4 mol percent hydrogen whereas at a rate of 205 milliliters per minute it contained 99.2 mol percent hydrogen.

In contrast to the results shown in Example VIII, when a sample of a mixture of diethylaluminum hydride and triethylaluminum (no added heavy metal catalyst or alkali metal co-catalyst) was maintained at 170° C. for two hours, disproportionation of diethylaluminum hydride apparently did not occur. No aluminum metal could be perceived in the system and an insignificant amount of gas was evolved (<25 ml.).

EXAMPLE IX

Utilizing the procedure generally as described in Example VIII, the following heavy metal compounds were found effective as catalysts for the thermocatalytic disproportionation of diethylaluminum hydride at 170° C.:

Titanium tetramethoxide
Titanium tetradodecoxide
Titanium trichloride/tetrahydrofuran complex ($TiCl_3 \cdot 3THF$)
Titanium dichloride
Vanadium tetrachloride
Thorium tetrachloride
Uranyl acetate
Samarium trichloride
Mixed rare earth chloride
Gadolinium trichloride
Cerous oxalate
Cerium trichloride
Zirconium tetrachloride Of the above substances, the first three were particularly effective.

EXAMPLE X

Samples of aluminum produced by the thermocatalytic disproportionation of diethylaluminum hydride at either 150° C. or 170° C. using either titanium tetrachloride or titanium tetraisopropoxide as the catalyst (with and without added sodium catalysts) were subjected to analyses for aluminum carbide contents. The analyses of seven such samples ranged from 0.03 to 0.12 weight percent $Al_4C_3$ and averaged 0.08 percent.

EXAMPLE XI

Diethylaluminum hydride was disproportionated in n-decane soluiton at 150° C. using $TiCl_4$ as the catalytic system. A sample of the gaseous coproduct was taken after 13 minutes of operation and after 500 milliliters of gas had already been liberated. This sample was subjected to analysis and found to have the following composition:

| Component: | Mol percent |
|---|---|
| Hydrogen | 97.4 |
| Methane | Trace |
| Ethane | 1.1 |
| Ethylene | 0.1 |
| Miscellaneous $C_4$ and higher | 0.4 |

EXAMPLE XII

Using titanium tetrachloride as catalyst and sodium aluminum diethyl dihydride as co-catalyst, diethylaluminum hydride was thermocatalytically disproportionated at 170° C. in the absence of a solvent. All of the hydrogenous gas liberated during the course of the reaction was collected as two separate samples. The first sample involved the initial 750 milliliters, i.e., the gas which was evolved during the first six minutes of operation. The second sample amounted to 550 milliliters and constituted the gas evolved from the 7th through the 51st minute of operation. These samples were analyzed and found to be as follows:

| Sample | Composition of hydrogenous gas, mol percent | | | |
|---|---|---|---|---|
| | Hydrogen | Ethane | Ethylene | Other |
| Initial 750 milliliters | 97.98 | 1.55 | | 0.47 |
| Final 550 milliliters | 89.94 | 2.93 | 2.67 | 4.46 |

EXAMPLE XIII

In this operation a typical aluminum-silicon alloy was hydroaluminated in order to produce a reaction system composed of diethylaluminum hydride and triethylaluminum. More particularly into a 300 milliliter Magne-Stir autoclave were placed 60 milliliters of triethylaluminum, 20 milliliters of toluene, 10 grams of sodium aluminum tetraethyl and 10 grams of powdered alloy (below 325 mesh) containing 68 weight percent aluminum, 27 weight percent silicon, 3 weight percent iron, and 2 weight percent titanium. The bomb was closed and stirring was started. The contents of the bomb were heated to 110° C. under a hydrogen atmosphere at 1500 p.s.i. After one hour of continuous heating and stirring the autoclave was cooled to room temperature and the hydrogenous gas vented. The contents of the bomb were filtered to remove residual solids.

A portion of the resultant reaction product (20 percent) was introduced into a flask along with 0.02 milliliter of titanium tetraisopropoxide and the system refluxed (approximately 110–120° C.) for about 30 minutes. During this time hydrogenous gas was evolved and aluminum metal precipitated from the liquid system. This aluminum powder was recovered by filtration, washed, dried, and weighed. The purified aluminum was found to amount to 0.93 gram.

EXAMPLE XIV

Using the reaction equipment described in Example XIII a mixture of diethylaluminum hydride and triethylaluminum was prepared by heating 10 grams of aluminum, 75 milliliters of triethylaluminum, and 5 grams of sodium aluminum tetraethyl to 120° C. under a hydrogen atmosphere at 2000 p.s.i.

A portion of the liquid reaction product (approximately 25 percent) was subjected to thermocatalytic disproportionation at about 160° C. using 0.01 milliliter of titanium tetrachloride. This operation yielded 1.18 grams of aluminum powder.

EXAMPLE XV

Using the reaction equipment described in Example XIII, 10 grams of aluminum, 75 milliliters of triethylaluminum, 25 milliliters of toluene and 1.0 gram of metallic sodium were heated under a hydrogen atmosphere (1000 p.s.i.) to a temperature of 120° C. for one hour. To a 25 milliliter sample of the resultant liquid diethylaluminum hydride-triethylaluminum reaction product was added 0.02 milliliter of titanium tetrachloride and the resulting system heated to 143° C. After 37 minutes of such heating a total of 1100 milliliters of hydrogenous gas and been evolved and aluminum powder had been formed.

EXAMPLE XVI

In this operation a mixture of diethylaluminum hydride and triethylaluminum was generated from crude aluminum, hydrogen and triethylaluminum; the solids were separated off; the liquid product was disproportionated into auminum, hydrogen and triethylaluminum; and the triethylaluminum was utilized in generating additional diethylaluminum hydride-triethylaluminum product. More particularly, 10 grams of the aluminum-silicon alloy referred to in Example XIII, 75 milliliters of triethylaluminum, 1 gram of sodium, and 25 milliliters of toluene were placed in an autoclave and heated at 110° C. under hydrogen at 1000 p.s.i. for 1.25 hours. During this time a pressure drop of 500 p.s.i. was observed. The reaction system was then cooled to room temperature and the residual solids filtered off.

Titanium tetrachloride (approximately 0.03 milliliter) was added to the solids-free diethylaluminum hydride-containing reaction product and the resultant solution heated for 60 minutes at 135° C. while collecting the hydrogenous gas evolved. This operation yielded 3.55 grams of aluminum powder (recovered from the triethylaluminum-containing liquid product by filtration) and 4.475 liters of the gas.

The triethylaluminum-containing filtrate was then charged into the autoclave along with another 10 grams of the aluminum-silicon alloy and 1 gram of sodium. The system was then heated to 110° C. for two hours under 1000 p.s.i. of hydrogen.

After cooling the reaction product to room temperature the residual solids were removed by filtration and the diethylaluminum hydride-containing liquid phase was treated with approximately 0.03 milliliter of titanium tetrachloride and heated to 128° C. for 67 minutes. During this time 2.630 liters of hydrogenous gas and 2.12 grams of aluminum were evolved.

EXAMPLE XVII

The procedure of Example XVI was generally followed using methylcyclohexane diluent rather than toluene. Specifically in the initial diethylaluminum hydride-triethylaluminum forming reaction 10 grams of the aluminum-silicon alloy, 75 milliliters of triethylaluminum, 1 gram of sodium and 25 milliliters of methylcyclohexane were held at 110° C. for two hours under hydrogen at 1000 p.s.i. In one hour a pressure drop of 500 p.s.i. had occurred.

After filtering off the residual solids the diethylaluminum hydride-containing reaction product was disproportionated at 130–148° C. for 48 minutes using 0.03 milliliter of titanium tetrachloride. This operation yielded 3.320 liters of hydrogenous gas and 2.80 grams of aluminum powder.

The residual triethylaluminum-containing liquid phase (from which the aluminum powder had been recovered by filtration) was utilized to prepare additional diethylaluminum hydride product by heating the same with an additional 10 grams of the alloy, 1 gram of sodium, and 10 milliliters of methylcyclohexane. This reaction was conducted at 110° C. under 1000 p.s.i. hydrogen for 1.25 hours.

The reaction product was then cooled to room temperature, filtered and subjected to disproportionation at 140° C. using 0.03 milliliter of titanium tetrachloride as the catalyst. After 38 minutes under these conditions a total of 2.702 liters of hydrogenous gas and 2.21 grams of aluminum powder were liberated and recovered.

Although this invention has as its principal utility that of producing aluminum, it will be understood and appreciated that it may also be considered as a process for the production of trialkylaluminum along with aluminum and hydrogen as by-products.

What is claimed is:

1. A process for producing aluminum which comprises thermocatalytically disproportionating dialkylaluminum hydride in the presence of at least one catalytic compound of a metal of Group IV–B, Group V–B, the Lanthanide Series or the Actinide Series, into aluminum, hydrogen and trialkylaluminum and recovering the aluminum so formed.

2. The process of claim 1 wherein the dialkylaluminum hydride is diethylaluminum hydride.

3. A process for producing aluminum which comprises:
   (a) generating dialkylaluminum hydride from crude aluminum, hydrogen and trialkylaluminum;
   (b) disproportionating the dialkylaluminum hydride in the presence of at least one catalytic compound of a metal of Group IV–B, Group V–B, the Lanthanide Series or the Actinide Series, into aluminum, hydrogen and trialkylaluminum; and
   (c) utilizing hydrogen and trialkylaluminum from (b) to generate additional dialkylaluminum hydride.

4. The process of claim 3 wherein the crude aluminum utilized in (a) is an alloy of aluminum.

5. The process of claim 3 wherein the dialkylaluminum hydride is diethylaluminum hydride and the trialkylaluminum is triethylaluminum.

6. The process of claim 3 wherein the crude aluminum utilized in (a) is an alloy of aluminum and wherein the dialkylaluminum hydride is diethylaluminum hydride and the trialkylaluminum is triethylaluminum.

7. A process for producing aluminum which comprises:
   (a) generating a liquid mixture of dialkylaluminum hydride and trialkylaluminum from crude aluminum, hydrogen and trialkylaluminum;
   (b) effecting a separation between the liquid mixture and residual solids of (a);
   (c) disproportionating dialkylaluminum hydride in the mixture from (b) in the presence of at least one catalytic compound of a metal of Group IV–B, Group V–B, the Lanthanide Series or the Actinide Series, into aluminum, hydrogen, and trialkylaluminum; and
   (d) utilizing hydrogen and trialkylaluminum from (c) to generate more of said liquid mixture in (a).

8. The process of claim 7 wherein the dialkylaluminum hydride is diethylaluminum hydride and the trialkylaluminum is triethylaluminum.

9. The process of claim 7 wherein the crude aluminum utilized in (a) is an alloy of aluminum.

10. The process of claim 7 wherein the dialkylaluminum hydride is diethylaluminum hydride and the trialkylaluminum is triethylaluminum and wherein the crude aluminum utilized in (a) is an alloy of aluminum.

11. A process for disproportionating dialkylaluminum hydride into aluminum, hydrogen, and trialkylaluminum which comprises heating dialkylaluminum hydride in the presence of a disproportionation promoting amount of at least one catalytic compound of a metal of Group IV–B, Group V–B, the Lanthanide Series or the Actinide Series to an elevated temperature at which metallic aluminum is formed and the mol ratio of liberated hydrogen to liberated hydrocarbon is at least about 8.5:1.

12. The process of claim 11 wherein the dialkylaluminum hydride is diethylaluminum hydride.

13. The process of claim 11 wherein a disproportionation promoting amount of a catalytic compound of titanium is employed.

14. The process of claim 11 wherein a dipsorportionation promoting amount of a catalytic titanium halide is employed.

15. The process of claim 11 wherein a disproportionation promoting amount of a catalytic titanium alkoxide is employed.

16. A process for disproportionating dialkylaluminum hydride into aluminum, hydrogen and trialkylaluminum which comprises heating the dialkylaluminum hydride to an elevated temperature at which metallic aluminum is formed without liberating an excessive amount of olefin, the disproportionation being effected in the presence of a disproportionation promoting amount of at least one heavy metal catalyst and at least one alkali metal catalyst.

17. The process of claim 16 wherein the dialkylaluminum hydride is diethylaluminum hydride.

18. The process of claim 16 wherein a disproportionation promoting amount of a titanium catalyst is employed.

19. The process of claim 16 wherein a disproportionation promoting amount of a titanium halide catalyst is employed.

20. The process of claim 16 wherein a disproportionation amount of a titanium alkoxide catalyst is employed.

21. The process of claim 16 wherein the alkali metal catalyst is a sodium catalyst.

22. The process of claim 16 wherein a disproportionation promoting amount of a titanium catalyst is employed and wherein the alkali metal catalyst is a sodium catalyst.

23. The process of claim 16 wherein a disproportionation promoting amount of titanium tetrachloride and a sodium catalyst are employed.

24. The process of claim 16 wherein the dialkylaluminum hydride is diethylaluminum hydride and wherein a disproportionation promoting amount of titanium tetrachloride and a sodium catalyst are employed.

25. The process of claim 16 wherein the dialkylaluminum hydride is diethylaluminum hydride in admixture with triethylaluminum, wherein a disproportionation promoting amount of a titanium chloride or titanium alkoxide catalyst is employed, wherein the alkali metal catalyst is a sodium catalyst, wherein the reaction temperature is in the range of from about 120° to about 190° C., and wherein the liberated gas contains at least 90 mol percent of hydrogen.

References Cited
UNITED STATES PATENTS 3,373,179    3/1968    Lewis _____ 260—448

FOREIGN PATENTS 208,337    8/1955    Australia _____ 75—68

L. DEWAYNE RUTLEDGE, Primary Examiner

WAYLAND W. STALLARD, Assistant Examiner

U.S. Cl. X.R.

75—68C; 260—448R

PO-1050
(5/69)

UNITED STATES PATENT OFFICE
CERTIFICATE OF CORRECTION

Patent No. 3,578,436           Dated May 11, 1971

Inventor(s) Warren E. Becker and Paul Kobetz

It is certified that error appears in the above-identified patent and that said Letters Patent are hereby corrected as shown below:

Column 7, line 56, reads "Covering", should read -- Converting --.
Column 12, line 26, reads "Othe", should read -- Other --.
Column 13, line 6, reads "gas and been", should read -- gas had been --; line 13 reads "auminum", should read -- aluminum --.
Column 14, line 72, reads "dipsorportiona-", should read -- disproportiona- --.  Column 16, line 1, reads "dialkylamlumi-", should read -- dialkylalumi- --.

Signed and sealed this 26th day of October 1971.

(SEAL)
Attest:

EDWARD M. FLETCHER, JR.          ROBERT GOTTSCHALK
Attesting Officer                Acting Commissioner of Patents